(12) United States Patent
Pantelides et al.

(10) Patent No.: US 6,571,524 B2
(45) Date of Patent: Jun. 3, 2003

(54) INTERCONNECTION OF BUILDING PANELS USING FIBER REINFORCED PLASTIC COMPOSITE-MATERIAL CONNECTOR PLATE

(75) Inventors: Chris P. Pantelides, Salt Lake City, UT (US); Lawrence D. Reaveley, Salt Lake City, UT (US)

(73) Assignee: University of Utah, Salt Lake City, UT (US)

( * ) Notice: Subject to any disclaimer, the term of this patent is extended or adjusted under 35 U.S.C. 154(b) by 0 days.

(21) Appl. No.: 09/935,731

(22) Filed: Jul. 3, 2001

(65) Prior Publication Data

US 2002/0033000 A1 Mar. 21, 2002

Related U.S. Application Data

(63) Continuation of application No. PCT/US00/00001, filed on Jan. 6, 2000.
(60) Provisional application No. 60/115,248, filed on Jan. 7, 1999.

(51) Int. Cl.[7] .............................. B32B 7/04; E04B 2/00; E04G 23/00; F16B 12/36

(52) U.S. Cl. .................. 52/582.1; 52/747.1; 52/745.09; 156/91; 156/92; 403/293

(58) Field of Search .............................. 156/91, 92, 71, 156/304.3, 306.6, 306.9; 52/747.1–745.13, 745.09, 582.1, 250, 251; 403/270, 286, 292, 293, 294

(56) References Cited

U.S. PATENT DOCUMENTS

| | | | | |
|---|---|---|---|---|
| 1,703,667 | A | * | 2/1929 | Green |
| 3,455,077 | A | * | 7/1969 | Long |
| 3,576,091 | A | * | 4/1971 | Shull |
| 3,964,220 | A | * | 6/1976 | Rutkowski |
| 4,581,870 | A | * | 4/1986 | Winkowski |
| 5,333,433 | A | * | 8/1994 | Porambo |
| 5,687,523 | A | * | 11/1997 | Stough |
| 5,711,124 | A | * | 1/1998 | Stough |
| 6,260,320 | B1 | * | 7/2001 | Di Lorenzo |

\* cited by examiner

*Primary Examiner*—Carl D. Friedman
*Assistant Examiner*—Kevin McDermott

(57) ABSTRACT

Cementitious building panels are connected together using a connector plate made of a composite material of carbon fibers embedded in an organic matrix. The interconnection is made by removing cementitious material to form recesses in the building panels, applying an adhesive material into the recesses prior to placing the connector plate into the recesses, and thereafter affixing the connector plate to the first-panel face and to the second-panel face in the recesses and extending across the gap between the first-panel edge and the second-panel edge.

32 Claims, 5 Drawing Sheets

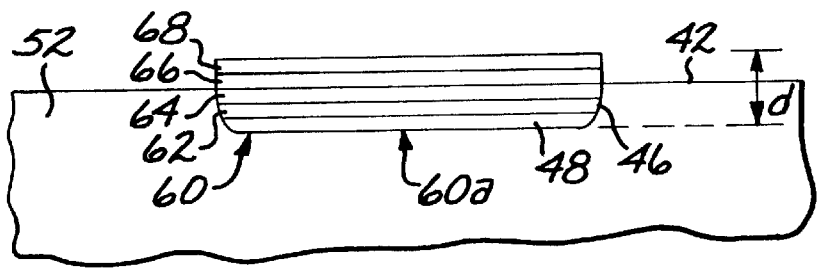
FIG. 5
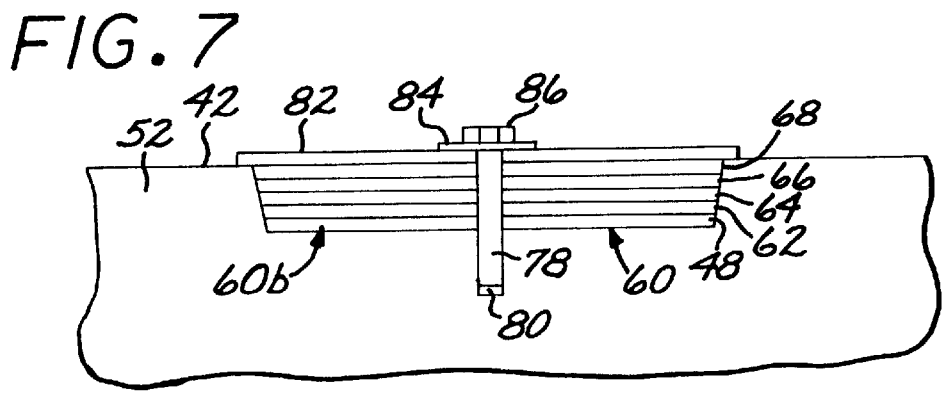
FIG. 6
FIG. 7

INTERCONNECTION OF BUILDING PANELS USING FIBER REINFORCED PLASTIC COMPOSITE-MATERIAL CONNECTOR PLATE

This application is a continuation of PCT application PCT/US00/00001, filed Jan. 6, 2000, the disclosure of which is hereby incorporated herein by reference; and the benefit of U.S. Provisional Application No. 60/115,248, filed Jan. 7, 1999, the disclosure of which is hereby incorporated herein by reference.

BACKGROUND OF THE INVENTION

Large precast and cast-in-place panels made of cementitious material are widely used in building construction. The panels are typically rectangular in shape. Two panels are positioned with their edges parallel to each other but slightly spaced apart. They are then joined with a steel connector. For example, two precast hollow-core panels are joined with a welded steel connector that is embedded into the interior structure of the two adjacent panels. A number of panels are joined in this fashion to define the walls, floors, and/or ceilings of the building.

Although this approach is widely used, the inventors have recognized that it has shortcomings. The cementitious material provides a highly alkaline chemical environment that can lead to rapid corrosion of the embedded portion of the steel connector. The portion that is not embedded may also corrode. The corrosion of the embedded portion of the steel connector is not visible for routine inspection, so that its extent is not known with certainty.

The steel connector weakens as it corrodes. The weakening leads to a lower strength of the building. The lower strength is of concern, particularly where the building is subject to seismic loadings. A building that is designed and built with adequate strength may become unsuitable where it has been weakened by corrosion of the steel connectors. Repairing and/or retrofitting the building to improve the strength of the connection is difficult, if not impossible, with this connection system.

There is a need for an improved approach to the interconnection of cementitious building panels and other structural building units that achieves acceptable strength but reduces the incidence of corrosion and premature failure. The present invention fulfills this need, and further provides related advantages.

SUMMARY OF THE INVENTION

The present invention provides a method for interconnecting building panels of a wide variety of types, and the connected structures. The present approach achieves adequate strength for static and seismic loadings. It also avoids corrosion typically associated with the use of steel interconnectors, and consequently maintains stable strength properties for extended periods of time. The present approach may be used in new construction and in repairing/retrofitting applications with equally advantageous results. It may be used to form walls, floors, and/or ceilings.

In accordance with the invention, a connection is formed between a first building panel having a first-panel face and a first-panel edge of the first-panel face, and a second building panel having a second-panel face and a second-panel edge of the second-panel face. The first-panel edge and the second-panel edge are adjacent to each other with a gap therebetween. The method includes furnishing a connector plate made of a composite material of fibers embedded in a matrix, and connecting the first building panel and the second building panel together using the connector plate. The step of connecting includes the step of affixing the connector plate to the first-panel face and to the second-panel face and extending across the gap between the first-panel edge and the second-panel edge. The gap is filled with a non-brittle material.

The first building panel and the second building panel are each preferably made of a cementitious material. The building panels may be solid or hollow. The building panels may be precast or cast-in-place. The first-panel edge and the second-panel edge are substantially parallel to each other and adjacent to each other, but typically not touching each other. The first face of the first building panel and the first face of the second building panel may be substantially coplanar. Examples include two panels that are part of a wall, two panels that are part of a floor, or two panels that are part of a ceiling. They may instead not be substantially coplanar. Examples include the joining of a wall panel to a floor panel, the joining of a wall panel to a ceiling panel, the joining of two non-coplanar wall panels to make a shaped wall, and the joining of two non-coplanar floor panels (as in a ramp of a parking garage).

Most preferably the connector plate comprises carbon fibers embedded in an organic matrix. The connector plate may be prepared as a plurality of plies of fibers, such as carbon fibers, embedded in an organic matrix. In one approach, the fibers are carbon fibers that are unidirectional within each ply, lie parallel to the faces of the panels, and are oriented at an appropriate angle to the panel edge depending on the panel configuration. Desirably, the angles of the fibers in alternating plies are balanced at $+/-\alpha$ degrees to the panel edge. That is, in one ply the fibers are oriented at $+\alpha$ degrees to the panel edge, in the next ply the fibers are oriented at $-\alpha 0$ degrees to the panel edge, and so on. In a typical case, $\alpha$ is about 45 degrees, but the invention is not so limited. An important advantage of the present approach is that the fibers in other plies may be oriented in other directions as well to achieve particular isotropic or anisotropic strength properties as may be needed for particular applications. For example, where out-of-plane bending exists at the panel interface, additional fiber reinforced plastic composite plies may be oriented with the fibers lying parallel to the face of the panel and in the 90-degree direction relative to the panel edge.

It is preferred that the connector plate be installed to cementitious building panels by removing cementitious material, as with a high-pressure water jet, to form a recess in the first building panel and the second building panel so that the connector plate may be received into the recess in the step of affixing. An adhesive material is applied into the recess prior to placing the connector plate into the recess. The connector plate may be affixed to at least one of the first plate and the second plate with an adhesive and/or with an anchor bolt. The adhesive should have a strength of at least about 3600 pounds per square inch (psi) in order to achieve load transfer into the connector plate.

The connector plate desirably overlaps each of the first building panel and the second building panel by an amount sufficient to fully load the fibers in the connector plate. According to calculation, the connector plate preferably overlaps each of the first building panel and the second building panel by an amount $L_d$ of at least about $2tE_{11}e_{11}/f$. In this relation, t is the thickness of the fiber reinforced composite connector plate, $E_{11}$ is the Young's modulus of the fiber reinforced composite material parallel to a direction of elongation of the fiber, $e_{11}$ is the maximum tensile strain of the fiber reinforced composite material before failure, and f is the peel off shear strength of the concrete from the first building panel.

The connector plate may be fabricated in place, by a collation, bonding, and curing procedure. Plies of the composite material are furnished and collated to form a multi-ply stack determined to have the required strength properties after curing. The plies are bonded together by curing, either at room temperature or by heating to a curing temperature. This approach allows the connector plate to be custom-made for each pair of building panels. Alternatively, standard connector plates may be fabricated remotely and bonded to the building panels at the construction site. Additional strength is achieved by lengthening the connector plate in the direction parallel to the edges of the building panels, or by using multiple connector plates.

The present approach permits large structures to be fabricated using building panels that are connected together at the construction site with the composite connector plates of the invention. The composite connector plates are not subject to the types of corrosion that weaken conventional steel connectors over time, so that the building strength remains at the initial design level. The composite materials are lighter than steel and may be handled more readily during fabrication. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 5 is an enlarged sectional view through a first one of the connector plates and joints of FIG. 4, taken along lines 5—5;

FIG. 6 is a plan view of the connection of FIG. 5;

FIG. 7 is an enlarged sectional view through a second one of the connector plates and joints of FIG. 4, taken along lines 7—7;

FIGS. 8A–8C are plan views of two nonplanar building panels connected by the present approach, wherein FIG. 8A illustrates the use of a single internal connector plate, FIG. 8B illustrates the use of a single external connector plate, and FIG. 8C illustrates the use of an internal connector plate and an external connector plate.

DETAILED DESCRIPTION OF THE INVENTION

Figure 1:
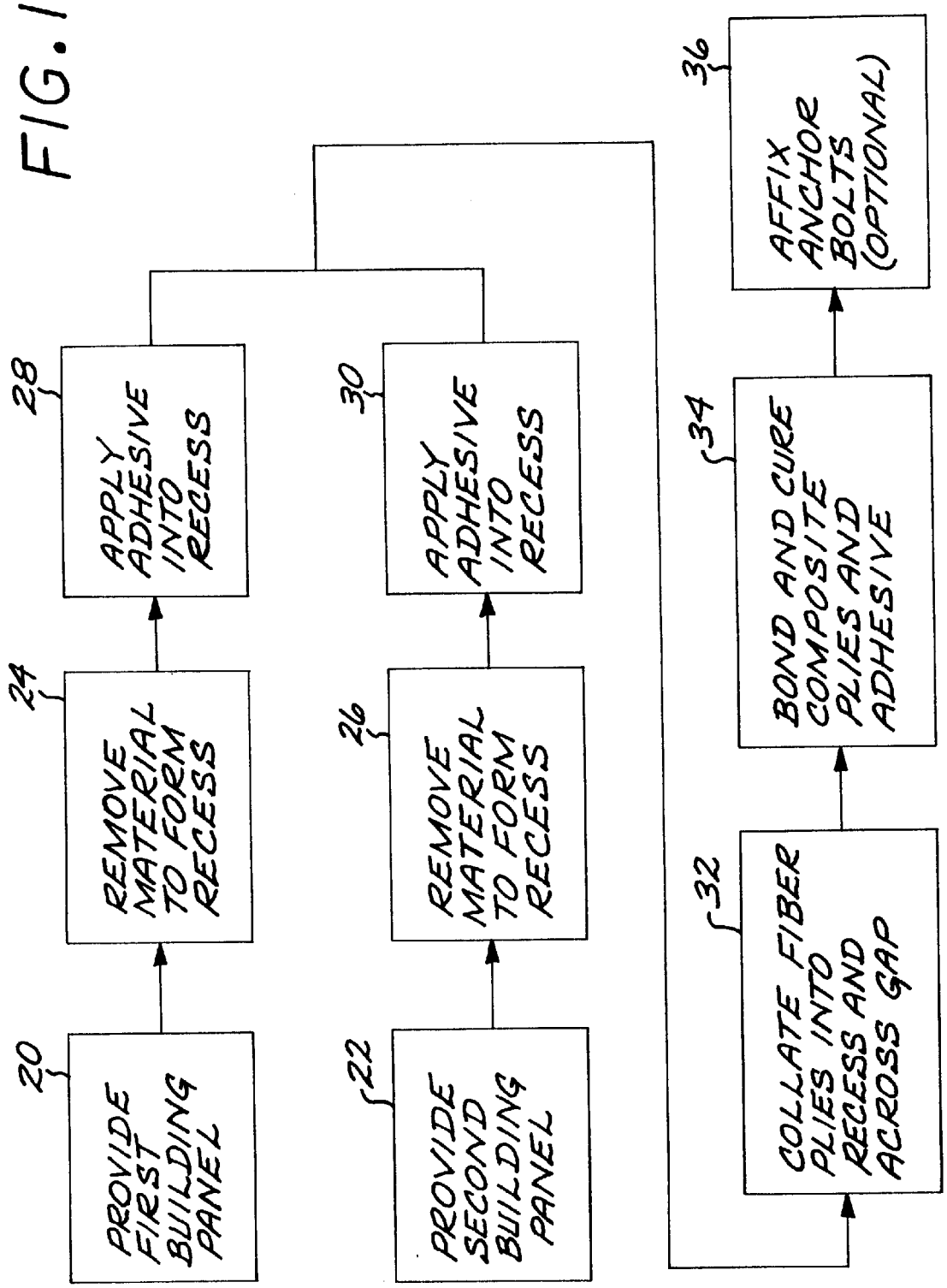
FIG. 1 is a block flow diagram of a preferred method of practicing the invention.
Figure 2:
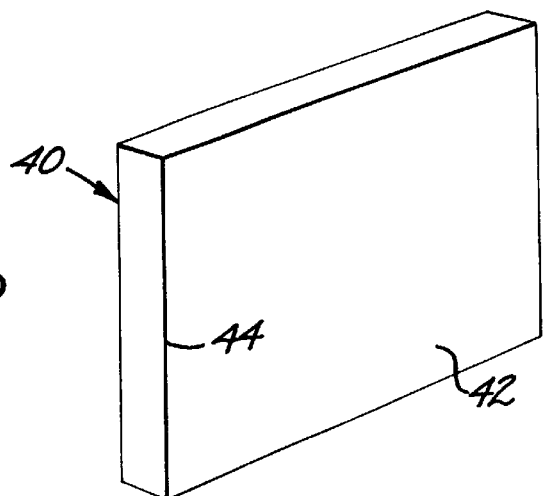
FIG. 2 is a perspective view of a building panel.

FIG. 1 depicts a preferred approach for practicing the invention. A structure is furnished, with building panels that are to be connected together. A first building panel is provided, numeral 20, and a second building panel is provided, numeral 22. A general-form building panel 40 illustrated in FIG. 2 is representative of the first and second building panels. The building panel 40 has a face 42 and an edge 44 of the face 42. The building panel 40 is illustrated as a rectangular flat panel, but it may be of any operable shape. The building panel 40 preferably comprises a cementitious material such as cement or concrete. The building panel 40 may be precast or cast-in-place in the building structure, or prepared by any other operable technique. The building may be solid or have a hollow interior. Structures of building panels and their preparation are known in the art, and do not form a part of the present invention. A virtue of the present invention is that it is operable with a wide variety of types of building panels. Although their sizes and weights vary according to the needs of particular structures, a typical building panel 40 has a size of 8–20 feet wide, 20–30 feet high, and 6–8 inches in thickness, and a weight of about 12,000 pounds for a hollow panel and 20,000 pounds for a solid panel.

Figure 3:
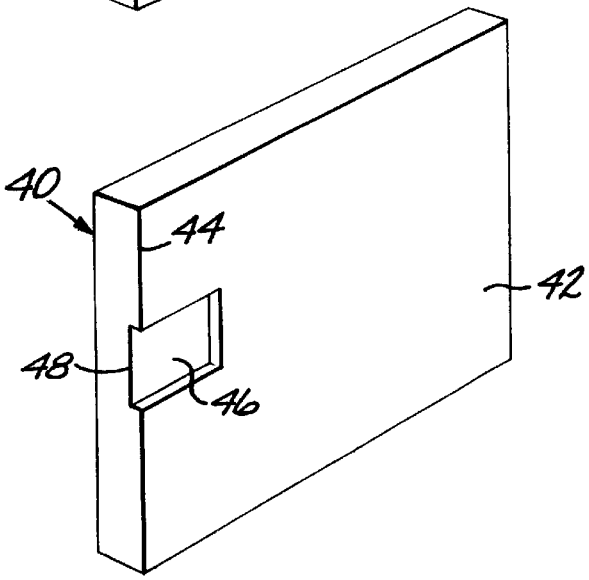
FIG. 3 is a perspective view of a building panel with a recess and adhesive in the recess.

The surface of the panel is prepared for the application of the connector plate. The adhesive bond strength of the connector plate to the building panel is important, as will be discussed subsequently. The surface of a cementitious building panel may be improved by removing surface material to form recesses in the two building panels, numerals 24 and 26. Building panels typically have a thin layer of cement paste at their surfaces to improve their appearance and seal the surfaces. The cement paste at the surface of the panels is removed to a depth of about ⅟₁₆ inch, thereby exposing the aggregate of the concrete. The preferred approach to removing the surface layer of the building panels is with a water jet operating at a pressure of about 40,000 pounds per square inch. The surface layer is not removed over the entire surface, but only to a sufficient lateral extent to receive the connector plate. The result of the material removal is a recess 46 in the face 42 of the building panel 40 and extending to the edge 44, illustrated in FIG. 3. After the recess 46 is formed, dust and loose particles are removed by vacuuming.

An adhesive layer 48 is deposited in the bottom of the recess 46 of the two panels, numerals 28 and 30. The adhesive preferably has the following minimum properties: tensile strength of about 3,600 pounds per square inch, modulus of elasticity of about $7.5 \times 10^5$ pounds per square inch (psi), flexural strength of about 4,400 psi, shear strength of about 3,400 psi, and elongation at break of about 0.4 percent. The preferred adhesive is a high-modulus gel two-component structural epoxy paste-adhesive, which is available commercially as Sikadur 31 from Sika Nationwide. This preferred adhesive conforms to ASTM C-881 and AASHTO M-235 specifications.

Figure 4:
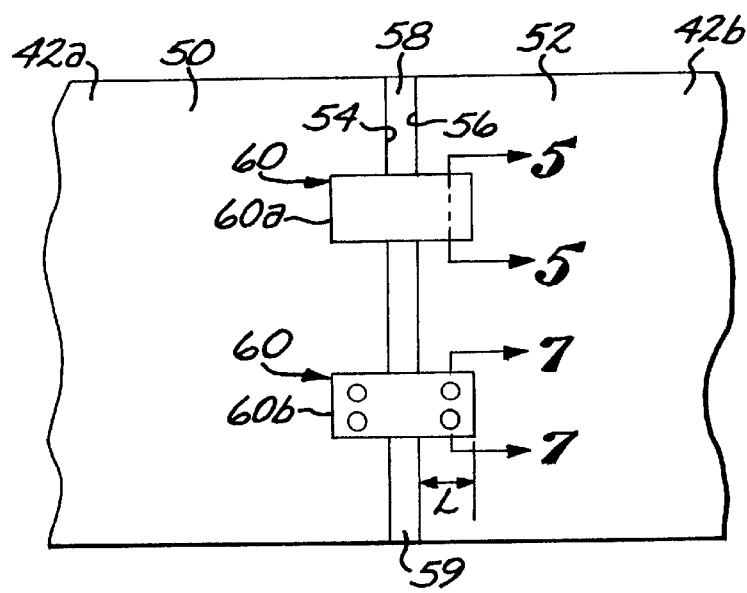
FIG. 4 is a schematic plan view of two building panels joined by two connector plates.

FIG. 4 illustrates the first building panel 50 and the second building panel 52 having respective first-panel face 42a and second-panel face 42b positioned with their respective edges 54 and 56 parallel to each other and adjacent to each other with a gap 58 therebetween. Each of the building panels 50 and 52 are of the type discussed generally in relation to FIGS. 2–3. The building panels 50 and 52 are usually either precast and positioned with a crane, or cast in place with the gap 58 therebetween. The gap 58 is typically about ½ inch in width, although this dimension is not critical as long as the connector plate can span the gap 58. The gap 58 is filled with any non-brittle material 59, such as, for example, polystyrene foam or polyurethane foam. The filling of the gap 58 may be accomplished either before or after the connector plate is furnished and attached. The building panels may form the walls, floors, ceilings, or other structural elements of the building.

A connector plate 60 is furnished and used to connect together the first building panel 50 and the second building panel 52. The connector plate 60 is made of a composite material comprising fibers, preferably carbon fibers, embedded in a nonmetallic matrix, preferably an epoxy matrix. The furnishing and connecting may be accomplished in any operable manner. In one approach, the connector plate 60 is separately fabricated as a final cured freestanding article and then joined to the building panels 50 and 52 using an adhesive and/or a mechanical fastener of a type different from an adhesive, such as an anchor bolt. This approach, though operable, is less favored than a second approach to be described next.

The preferred approach for furnishing the connector plate 60 and connecting the building panels 50 and 52 together is accomplished by collating plies of the composite material into the recesses 46 of each of the building panels 50 and 52 so as to span the gap 58, numeral 32. That is, the connector plate 60 is custom fabricated in each joint. The result is that the connector plate 60 is exactly sized and positioned for the particular joint. This approach is advantageous because the joints and positioning of the building panels 50 and 52 are not always precise, due to their large size and weight. The gap 58 is filled with the non-brittle material 59.

In the collation process, sheets of unidirectional fabric are obtained. (Sheets of non-unidirectional fibers, such as woven fibers, may also be used.) The fibers are preferably carbon fibers. Prepreg composite sheet materials, available commercially from suppliers such as Thiokol (TCR Composites), may be used as well.

In forming the connector plate, the sheets of the unidirectional fabric are cut to the correct size to be received within the recess 46 and to span the gap 58 between the two building panels 50 and 52, as illustrated in FIGS. 5 and 6 for one of the connectors 60a of FIG. 4.

The length of overlap L of the sheets, and thence the connector plate, over the building panels is desirably sufficient to allow a full loading of the fibers in the composite material by a shear-loading mechanism. The most efficient use of the composite material is thereby obtained. A calculation has determined that the minimum overlap $L_d$ is at least about $2tE_{11}e_{11}/f$, where t is the thickness of the fiber reinforced composite connector plate, $E_{11}$ is the Young's modulus of the fiber reinforced composite material parallel to a direction of elongation of the fiber, $e_{11}$ is the maximum tensile strain of the fiber reinforced composite material before failure, and f is the peel-off shear strength of the concrete from the building panel. To achieve full utilization of the strength capability of the fibers in the composite material, the overlap length L should be at least as great as $L_d$. If L is less than $L_d$, the invention remains operable although the fiber strength is not fully utilized. If L is greater than $L_d$, the fiber strength is fully utilized but the connector plate is excessively long and no additional benefit is obtained.

The sheets of prepreg composite material may be oriented in any desired fashion. In a preferred approach, there are multiple layers or plies of the sheets of prepreg composite material positioned overlying and contacting each other. By way of example, FIGS. 5 and 6 illustrate a total of four plies 62, 64, 66, and 68 collated into the recess 46, but there may be more or fewer plies in any particular situation. FIG. 6 shows the structure with the overlying plies removed to illustrate the orientations of the fibers in the plies. The fibers in the various plies all lie parallel to the face 42. In the lowest ply 62 that contacts the adhesive layer 48, the unidirectional fibers have an orientation that is also parallel to line 70. The fibers are oriented at an angle of $-\alpha$ degrees to the edges 54 and 56. In the next overlying ply 64, the fibers are oriented parallel to line 72 at an angle of $+\alpha$ degrees to the edges 54 and 56. In the next overlying ply 66, the fibers are oriented parallel to line 74 at an angle of $-\alpha$ degrees to the edges 54 and 56. In the next overlying ply 68, which is the top layer in this four-ply embodiment, the fibers are oriented parallel to line 76 at an angle of $+\alpha$ degrees to the edges 54 and 56. In a preferred case, a is about 45 degrees, but the invention is not so limited. The orientations of the fibers may be established at other values as desired for particular isotropic or anisotropic strength values of the connector plate 60, depending upon the panel configuration. For example, where out-of-plane bending exists at the panel interface, additional fiber reinforced plastic (FRP) plies may be added in the 90-degree direction (perpendicular to the edges 54 and 56).

As many connector plates 60 may be used along the lengths of the edges 54 and 56 as desired, and may be made as wide as desired, to achieve particular strength values for the interconnection between the building panels 50 and 52. In FIG. 4 two connector plates 60a and 60b are illustrated. The connector plates 60a and 60b are similar, except for their manner of connection to the building panels 50 and 52. The connector plate 60a of FIGS. 4, 5, and 6 is joined to the building panels 50 and 52 solely by an adhesive bond through the adhesive layer 48. The connector plate 60b of FIGS. 4 and 7 is joined to the building panels 50 and 52 by the adhesive bond through the adhesive layer 48, and additionally with a mechanical fastener of a type different from an adhesive, such as an illustrated anchor bolt 78. The anchor bolt 78 is inserted into a pre-drilled hole 80 containing an epoxy anchoring insert. A neoprene pad 82 overlies the connector plate 60, and a fender washer 84 is positioned between a nut 86 that is threaded onto the anchor bolt 78 and the neoprene pad 82. The connector plate 60b of FIG. 7 is illustrated as having an upper surface that lies flush with the face 42 of the building panel, in order to accommodate this mechanical fastener. The connector plate 60a of FIG. 5 is illustrated as extending above the face 42. Any operable arrangement of this type may be used.

After the plies of the connector plate 60 are collated, the plies are bonded to each other and to the building panel. A polymeric matrix, preferably an epoxy, is used to form the composite material. The polymeric matrix material, furnished in a liquid form, is flowed into the collated arrangement of sheets and thereafter cured, numeral 34. The plies are simultaneously bonded to the building panels through the adhesive layer 48. The curing is accomplished according to the manufacturer's recommendations for the particular organic material used as the matrix of the composite material. For some matrix materials, curing is accomplished at room temperature, and for other matrix materials, curing is accomplished by heating to elevated temperature. The heating, if used, is accomplished by any operable approach, such as heat lamps.

The mechanical fastener in the form of the anchor bolt 78, if used, is thereafter installed to further affix the connector plate 60 to the building panel.

Figure 8A:
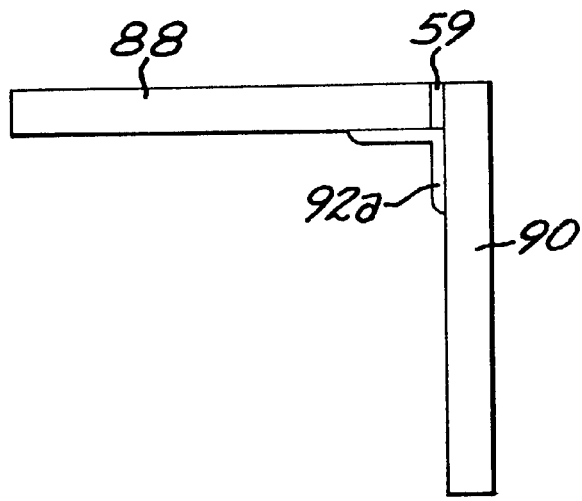
Figure 8B:
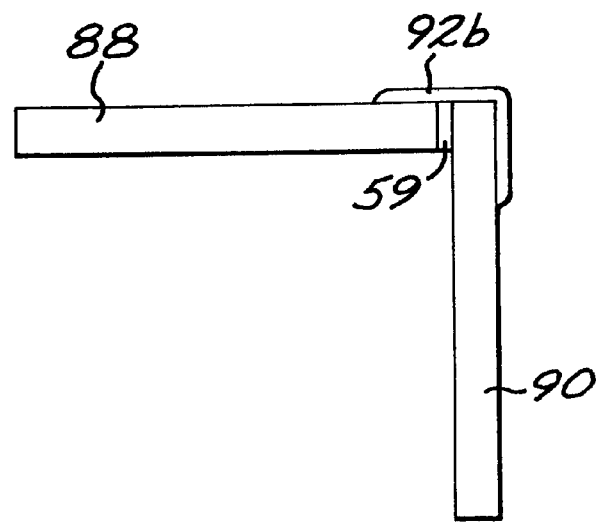
Figure 8C:
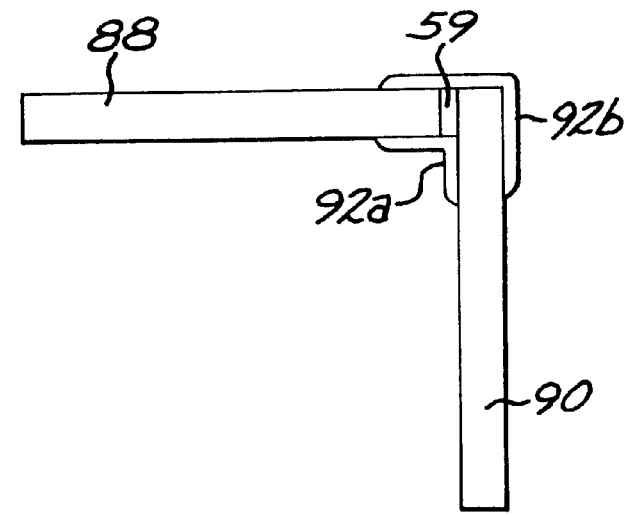

The preceding discussion has focused on the use of the connector plate 60 to attach building panels 50 and 52 whose faces are essentially coplanar. The present approach may also be used where the building panels are not coplanar. FIGS. 8A–8C illustrate the joining of two non-coplanar building panels 88 and 90 with one or more L-shaped connector plates. In FIG. 8A, a single connector plate 92a is used on the inside surfaces of the building panels 88 and 90; in FIG. 8B, a single connector plate 92b is used on the outside surfaces of the building panels 88 and 90; and in FIG. 8C both connector plates 92a and 92b are used. Such a situation involving nonplanar building panels 88 and 90 might be found, for example, at the joint between two walls, between a wall and a ceiling, between a wall and a floor, or between two non-coplanar wall, ceiling, or floor segments. The procedures used to form this connection are the same as described previously, which description is incorporated here. A virtue of the present collation approach for preparing the connector plates is that they may be given any necessary shapes to properly span the gap between the two connector plates.

Figure 9:
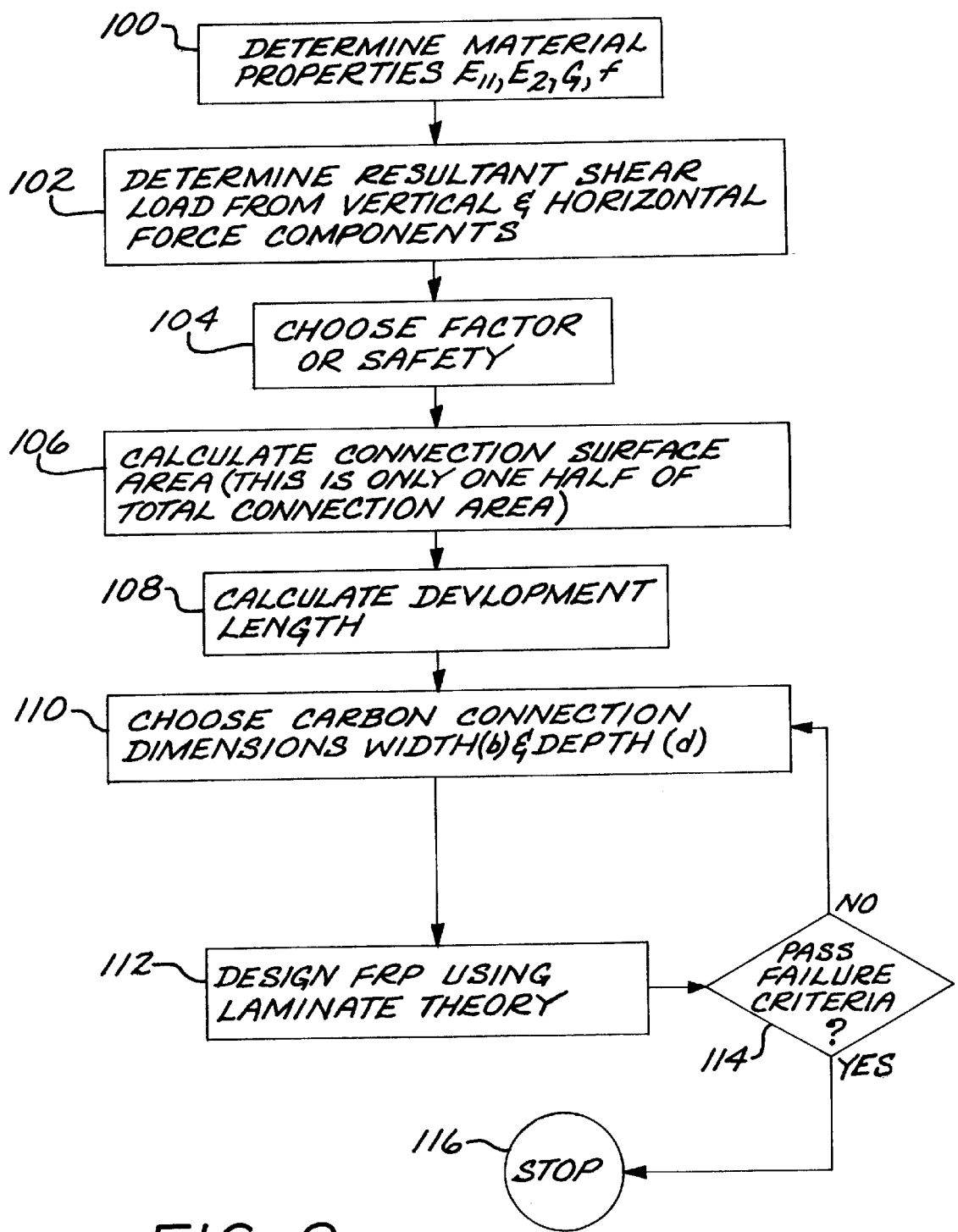
FIG. 9 is a flow sheet for a preferred approach to designing a connector plate.

FIG. 9 is a flow chart for a preferred technique of designing a connector plate using the approach of the invention. The material properties of the composite material that constitutes the connector plate are obtained, numeral 100, typically from the supplier of the composite material or by tests of specimens. The shear loads on the building panels 40 are determined, numeral 102, from structural analysis of the building itself. A safety factor is chosen, numeral 104. The required connection surface area at the location of the connector plate(s) to carry the shear loads is calculated, numeral 106. From this information, the development length $L_d$ is calculated in the manner described earlier, numeral 108. The size (width b and depth d, see FIG. 6) of the connector plate 60 is selected, numeral 112. If this connector plate 60 is sufficient to meet failure criteria of the interconnection between the building panels, numeral 114, the design is completed, numeral 116. If the connector plate 60 does not meet the failure criteria, the design process 110, 112 is repeated.

Tests were conducted in which the operability of the present approach was established for full-size building panels. The approach described herein was followed to form the interconnections, and the resulting joined panels were tested to failure in shear loading. The testing generally verified the determination of $L_d$ and the adequate strength of the fiber reinforced composite connections.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of forming a connection between building panels, comprising the steps of
    furnishing a structure comprising
        a first building panel having a first-panel face and a first-panel edge of the first-panel face, and
        a second building panel having a second-panel face and a second-panel edge of the second-panel face, the first-panel edge and the second-panel edge being adjacent to each other with a gap therebetween;
    furnishing a connector plate made of a composite material of fibers embedded in a matrix; and
    connecting the first building panel and the second building panel together using the connector plate, the step of connecting including the step of
        affixing the connector plate to the first-panel face and to the second-panel face and extending across the gap between the first-panel edge and the second-panel edge, wherein the step of affixing includes a step of affixing the connector plate to the first building panel and the second building panel using an adhesive having a tensile strength of at least 3,600 pounds per square inch.

2. The method of claim 1, wherein the first building panel and the second building panel are each made of a cementitious material.

3. The method of claim 1, wherein the first-panel face of the first building panel and the second-panel face of the second building panel are substantially coplanar.

4. The method of claim 1, wherein the first-panel face of the first building panel and the second-panel face of the second building panel are not substantially coplanar.

5. The method of claim 1, wherein the step of affixing includes the step of
    affixing the connector plate to at least one of the first plate and the second plate with an adhesive.

6. The method of claim 1, wherein the connector plate comprises a plurality of plies of carbon fibers embedded in an organic matrix.

7. The method of claim 1, wherein the step of affixing includes the step of
    affixing the connector plate to at least one of the first plate and the second plate with a mechanical fastener in addition to the adhesive.

8. The method of claim 1, wherein the steps of furnishing and connecting are performed simultaneously and include the step of
    custom fabricating the connector plate in place to the first building panel and to the second building panel.

9. The method of claim 1, wherein the steps of furnishing and connecting include the steps of
    separately fabricating the connector plate as a freestanding article, and thereafter
    joining the connector plate to the first building panel and to the second building panel.

10. A method of forming a connection between building panels, comprising the steps of
    furnishing a structure comprising
        a first building panel having a first-panel face and a first-panel edge of the first-panel face, and
        a second building panel having a second-panel face and a second-panel edge of the second-panel face, the first-panel edge and the second-panel edge being adjacent to each other with a gap therebetween;
    furnishing a connector plate made of a composite material of fibers embedded in a matrix, wherein the connector plate comprises carbon fibers embedded in an organic matrix; and
    connecting the first building panel and the second building panel together using the connector plate, the step of connecting including the step of
        affixing the connector plate to the first-panel face and to the second-panel face and extending across the gap between the first-panel edge and the second-panel edge.

11. The method of claim 10, wherein the connector plate comprises a plurality of plies of carbon fibers embedded in the organic matrix.

12. The method of claim 10, wherein the connector plate comprises a plurality of plies of carbon fibers embedded in the organic matrix, and wherein the carbon fibers are unidirectional within each ply.

13. The method of claim 10, wherein the steps of furnishing and connecting are performed simultaneously and include the step of
    custom fabricating the connector plate in place by collating and applying plies of the composite material to the first building panel and to the second building panel.

14. The method of claim 10, wherein the steps of furnishing and connecting include the steps of separately fabricating the connector plate as a freestanding article, and thereafter joining the connector plate to the first building panel and to the second building panel.

15. A method of forming a connection between building panels, comprising the steps of furnishing a structure comprising
a first building panel having a first-panel face and a first-panel edge of the first-panel face, and
a second building panel having a second-panel face and a second-panel edge of the second-panel face, the first-panel edge and the second-panel edge being adjacent to each other with a gap therebetween, wherein the first building panel and the second building panel are each made of a cementitious material;

furnishing a connector plate made of a composite material of fibers embedded in a matrix; and connecting the first building panel and the second building panel together using the connector plate, wherein the step of connecting includes the steps of
removing cementitious material to form a recess in the first building panel and the second building panel,
applying an adhesive material into the recess prior to placing the connector plate into the recess, and thereafter
affixing the connector plate to the first-panel face and to the second-panel face and extending across the gap between the first-panel edge and the second-panel edge, and wherein the connector plate is received into the recess in the step of affixing.

16. The method of claim 15, wherein the steps of furnishing and connecting are performed simultaneously and include the step of custom fabricating the connector plate in place to the first building panel and to the second building panel.

17. The method of claim 15, wherein the steps of furnishing and connecting include the steps of separately fabricating the connector plate as a freestanding article, and thereafter joining the connector plate to the first building panel and to the second building panel.

18. A method of forming a connection between building panels, comprising the steps of furnishing a structure comprising
a first building panel having a first-panel face and a first-panel edge of the first-panel face, and
a second building panel having a second-panel face and a second-panel edge of the second-panel face, the first-panel edge and the second-panel edge being adjacent to each other with a gap therebetween;

furnishing a connector plate made of a composite material of fibers embedded in a matrix; and connecting the first building panel and the second building panel together using the connector plate, the step of connecting including the step of
affixing the connector plate to the first-panel face and to the second-panel face and extending across the gap between the first-panel edge and the second-panel edge, wherein the step of affixing includes the step of affixing the connector plate to at least one of the first plate and the second plate with a mechanical fastener.

19. The method of claim 18, wherein the steps of furnishing and connecting are performed simultaneously and include the step of custom fabricating the connector plate in place to the first building panel and to the second building panel.

20. The method of claim 18, wherein the steps of furnishing and connecting include the steps of separately fabricating the connector plate as a freestanding article, and thereafter joining the connector plate to the first building panel and to the second building panel.

21. A method of forming a connection between building panels, comprising the steps of furnishing a structure comprising
a first building panel having a first-panel face and a first-panel edge of the first-panel face, and
a second building panel having a second-panel face and a second-panel edge of the second-panel face, the first-panel edge and the second-panel edge being adjacent to each other with a gap therebetween;

furnishing a connector plate made of a composite material of fibers embedded in a matrix; and connecting the first building panel and the second building panel together using the connector plate, the step of connecting including the step of
affixing the connector plate to the first-panel face and to the second-panel face and extending across the gap between the first-panel edge and the second-panel edge, wherein the connector plate overlaps each of the first building panel and the second building panel by an amount $L_d$ of at least about $2tE_{11}e_{11}/f$, where t is the thickness of the fiber reinforced composite, $E_{11}$ is the Young's modulus of the fiber reinforced composite parallel to a direction of elongation of the fiber, $e_{11}$ is the maximum tensile strain of the fiber reinforced composite before failure, and f is the peel off shear strength of the concrete from the first building panel.

22. The method of claim 21, wherein the steps of furnishing and connecting are performed simultaneously and include the step of custom fabricating the connector plate in place to the first building panel and to the second building panel.

23. The method of claim 21, wherein the steps of furnishing and connecting include the steps of separately fabricating the connector plate as a freestanding article, and thereafter joining the connector plate to the first building panel and to the second building panel.

24. A method of forming a connection between building panels, comprising the steps of furnishing a structure comprising
a first cementitious building panel having a first-panel face and a first-panel edge of the first-panel face, and
a second cementitious building panel having a second-panel face and a second-panel edge of the second-panel face, the first-panel edge and the second-panel edge being adjacent to each other with a gap therebetween;

furnishing a connector plate made of a composite material of carbon fibers embedded in an organic matrix; and connecting the first building panel and the second building panel together using the connector plate, the step of connecting including the step of
removing cementitious material to form a recess in the first building panel and the second building panel, thereafter
applying an adhesive material into the recess prior to placing the connector plate into the recess, and thereafter affixing the connector plate to the first-panel face and to the second-panel face in the recess and extending across the gap between the first-panel edge and the second-panel edge.

25. The method of claim 24, wherein the first face of the first building panel and the first face of the second building panel are substantially coplanar.

26. The method of claim 24, wherein the first face of the first building panel and the first face of the second building panel are not substantially coplanar.

27. The method of claim 24, wherein the connector plate comprises a plurality of plies of carbon fibers embedded in an organic matrix.

28. The method of claim 24, wherein the connector plate comprises a plurality of plies of carbon fibers embedded in an organic matrix, and wherein the carbon fibers are unidirectional within each ply.

29. The method of claim 24, wherein the connector plate overlaps each of the first building panel and the second building panel by an amount $L_d$ of at least about $2tE_{11}e_{11}/f$, where t is the thickness of the fiber reinforced composite, $E_{11}$ is the Young's modulus of the fiber reinforced composite parallel to a direction of elongation of the fiber, $e_{11}$ is the maximum tensile strain of the fiber reinforced composite before failure, and f is the peel off shear strength of the concrete from the first building panel.

30. The method of claim 24, wherein the step of affixing includes a step of affixing the connector plate to the first building panel and the second building panel using the adhesive having a tensile strength of at least about 3,600 pounds per square inch.

31. The method of claim 13, wherein the steps of furnishing and connecting are performed simultaneously and include the step of custom fabricating the connector plate in place by collating and applying plies of the composite material to the first building panel and to the second building panel.

32. The method of claim 13, wherein the steps of furnishing and connecting include the steps of separately fabricating the connector plate as a freestanding article, and thereafter joining the connector plate to the first building panel and to the second building panel.

* * * * *